Nov. 5, 1940.                F. BOEHM                2,220,675
                             ROTAMETER
                        Filed March 30, 1938
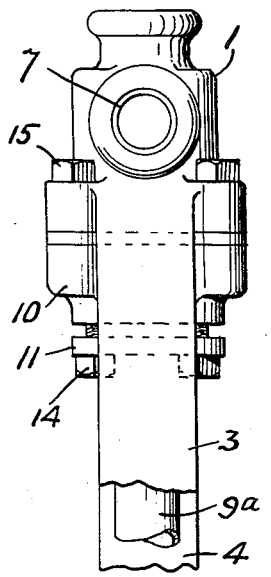
FIG.2.
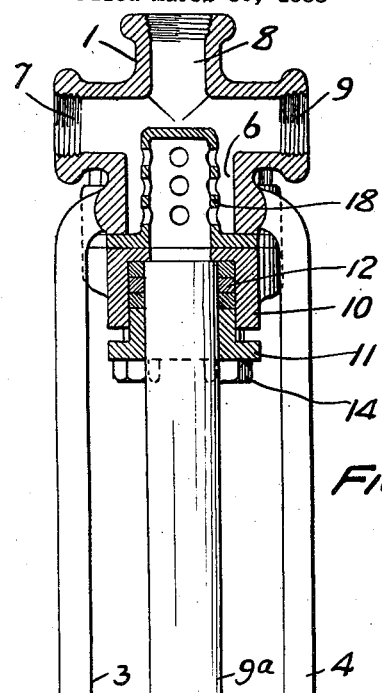
FIG.1.
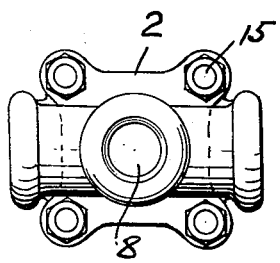
FIG.3.
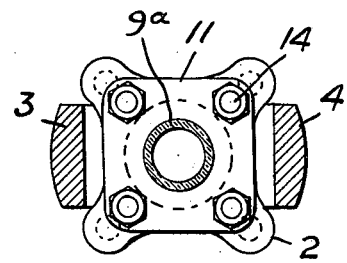
FIG.4.
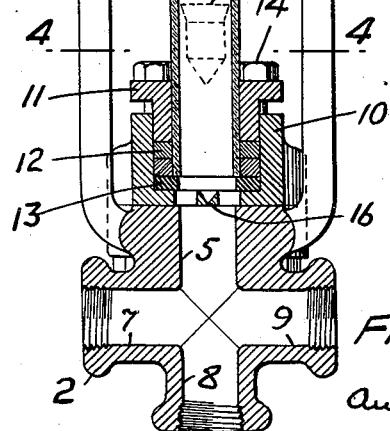
WITNESS:
Mr R Kitchel
INVENTOR
Frederick Boehm
BY
Augustus B. Stoughton
ATTORNEY.

Patented Nov. 5, 1940

2,220,675

UNITED STATES PATENT OFFICE 2,220,675

ROTAMETER

Frederick Boehm, Philadelphia, Pa., assignor to Schutte and Koerting Company, Philadelphia, Pa., a corporation of Pennsylvania Application March 30, 1938, Serial No. 198,837

4 Claims. (Cl. 73—209)

The principal object of the present invention is to provide for conveniently dismounting the taper or flow tube and for remounting it by a sidewise motion or movement in respect to the frame of the instrument for the purpose of cleaning it.

Other objects of the invention will appear from the following description at the end of which the invention will be claimed.

Generally stated, the invention comprises a frame having spaced opposed heads provided with fluid-ways, a tube positioned between the fluid-ways, and packing and coupling elements adapted for permanent sealing attachment to the two walls at the ends of the tube and for detachable connection with the heads, whereby the tube and attached elements may be mounted and dismounted as a unitary structure by sidewise movement in respect to the frame.

The invention also comprises the improvements to be presently described and finally claimed.

In the following description, reference will be made to the accompanying drawing forming part hereof and in which:

Fig. 1 is an elevational view, partly in central section, illustrating a rotameter embodying features of the invention.

Fig. 2 is a side view of the upper part of the structure shown in Fig. 1.

Fig. 3 is a top or plan view of Fig. 2.

Fig. 4 is a sectional view taken on the line 4—4 of Fig. 1.

Referring to the drawing, there is a frame which constitutes a self-supporting structure and which includes spaced opposed heads 1 and 2 provided with fluid-ways. The frame also includes columns 3 and 4 either cast integral with the heads or otherwise rigidly secured to them. The heads are provided with fluid-ways 5 and 6 of which 5 is the inlet and 6 is the outlet. Each head is also provided with branch fluid-ways 7, 8 and 9. The branch fluid-ways enable the instrument to be installed in various localities in which the direction of the inlet and outlet pipes differs. The fact that the frame is a rigid one enables it to properly support the tapered tube 9a, which is frequently made of glass, or at any rate transparent material, and therefore should be cleaned from time to time and obviously for that purpose it should be detached from the frame. For this purpose, use is made of packing and coupling elements which are permanently attached in sealing contact to the exterior walls of the tube at the ends thereof. As shown, the packing and sealing elements are duplicates and therefore the description of one of them will suffice. 10 indicates a box; 11 the gland; and 12 the packing. While it is true that the elements under discussion are duplicates, use is made in the element at the bottom of the tube of a cushioning washer 13 upon which the tube rests. The box 10 and gland 11 are connected together by screws 14 of which four are shown, and the box element is connected with the head by another set of screws 15. Incidentally, it may be said that the spider 16 constitutes a stop for the float 17 and the cage 18 constitutes a second stop for the float 17. The cage 18 is shown as interposed between the box 10 and the face of the head 1 and clamped in that position.

To remove the tube from the frame, all that is required is that the screws 15 be backed off, thus freeing the boxes 10 from the heads 1 and 2 so that the tube, together with the packing and sealing elements adherent to it, can be removed sidewise, which is a matter of convenience and which avoids breakage of the tube. The tube and its fittings can be remounted in the frame by a reversal of the described operation. The tube can be removed from the boxes by unscrewing the screws 14 thereby releasing the glands and packing.

It will be obvious to those skilled in the art to which the invention relates that modifications may be made in details of construction and arrangement in matters of mere form without departing from the spirit of the invention which is not limited in respect to such matters or otherwise than the appended claims may require.

I claim:

1. For a flow meter including a frame having columns and spaced opposed heads immovably connected by the columns and provided with fluid-ways and a tube shorter than the distance between the heads and positioned between said fluid-ways, means for detachably mounting the tube in the frame comprising packing and coupling elements separate from the frame and adapted for permanent sealing attachment to the tube walls at the ends of the tube and for detachable connection with the heads, whereby the tube and attached elements may be mounted and dismounted as a unitary structure by side-wise movement without disturbing the columns or the packing of the coupling elements.

2. In a flow meter comprising, a transparent tube and a rigid frame provided with columns and spaced heads having fluid-ways to the ends of the tube and between which the tube is adapted to be mounted and unmounted by sidewise movement, the tube being shorter than the distance between the heads, combined coupling and packing elements secured at the ends of the tube and constituting therewith a unitary structure capable of being handled as such, and means for detachably and directly connecting the heads and said elements while the latter are secured to the tube.

3. For connecting and disconnecting the tube of a flow meter to and from the spaced heads of its frame; means comprising columns integral with the heads, and boxes adapted to receive the ends of the tube and each having a packing and a gland and gland tightening means, and means exposed for operation from the exterior of the frame and separate from the gland tightening means and interposed between the boxes and heads and adapted to couple and uncouple the boxes and heads.

4. Means for mounting a flow meter so as to allow detachment of the tube of the meter for cleaning or the like without disturbing the adjustment of the packing and sealing means for said tube, said means comprising the combination of, confronting inlet and outlet pipes, a frame having heads provided with fluid-ways therethrough communicating with said pipes and having columns adapted to hold said pipes in a desired position relative to each other, a tube located within said frame and communicating with said fluid-ways, packing and sealing means securing said tube at its ends to said heads and adjustable to provide a tight seal around the communications between the ends of said tube and said fluid-ways, and fastening means having portions exposed at the surface of said frame and detachably securing said packing and sealing means and said tube supported by said packing and sealing means to said frame.

FREDERICK BOEHM.